United States Patent

Short, Jr. et al.

[15] 3,693,857

[45] Sept. 26, 1972

[54] LOADING DEVICE

[72] Inventors: Ray L. Short, Jr., Glenview; Howard Bowen, Wilmette; David L. Henderson, Mundelein, all of Ill.

[73] Assignee: Research Technology Incorporated, Skokie, Ill.

[22] Filed: July 16, 1971

[21] Appl. No.: 163,244

[52] U.S. Cl. ................... 226/91, 226/114, 226/196, 352/158
[51] Int. Cl. ............................................. G03b 1/58
[58] Field of Search .......... 226/90, 91, 113, 114, 196; 352/157, 158

[56] References Cited

UNITED STATES PATENTS 2,916,228  12/1959  Wellington .......... 226/196 UX
3,259,291  7/1966  Maurer ................ 352/158 X Primary Examiner—Richard A. Schacher
Attorney—Carlton Hill et al.

[57] ABSTRACT

This invention provides an improvement for loading a strip, film, tape and the like, in a transport mechanism which includes a spaced pair of relatively movable rollers and a predetermined pathway between the rollers. The improvement comprises means for positioning the rollers relative to one another, an inclined plane surface canted downwardly toward the space between the rollers and lying in a plane parallel to the film pathway between the rollers, and a casing part extending over at least one of the rollers and displaced rearwardly from the outer edge of the inclined plane surface to provide a shoulder on the outer edge of the surface having free access vertically above it to facilitate positioning film on the surface.

12 Claims, 3 Drawing Figures

PATENTED SEP 26 1972 3,693,857

INVENTORS
RAY L. SHORT, JR.
HOWARD BOWEN
DAVID L. HENDERSON
ATTORNEYS

LOADING DEVICE

BACKGROUND OF THE INVENTION

This invention relates to a device for loading a strip, film, tape and the like, in a transport mechanism.

There are various types and kinds of transport mechanisms through which strips of materials, films, tapes and the like are passed inbetween feed and take-up rollers. These can be any of the numerous types of film projectors, film editors, film and tape inspecting machines, tape recorders and tape playing machines.

In loading each of these apparatuses and machines, the strip, film or tape must be carefully threaded by hand through a narrow slot or opening and placed in the path, usually on sprocket rollers, along which it is passed through the machine. This procedure of loading the strip, film or tape in a machine is not only difficult and tedious but requires a considerable amount of time for properly loading the strip or film. This difficult and time-consuming procedure is particularly disadvantageous in machines such as a film editor and film and tape inspection machines where great numbers of rolls of films and tapes have to be processed in short periods of time.

Accordingly, it is an object of the present invention to provide a means for easily and efficiently loading transport mechanisms with strips films, tapes or the like.

A more specific object of the present invention is to provide a device which can be incorporated with transport mechanisms for loading therein strips, films, tapes or the like without any threading process.

SUMMARY OF THE INVENTION

We have, accordingly, provided improved means for easily and efficiently loading a transport mechanism with a strip, film, tape or the like. The transport mechanism includes a spaced pair of relatively movable rollers and a predetermined pathway inbetween the rollers. The improvement comprises means for positioning the rollers relative to one another, an inclined surface control downwardly toward the space between the rollers and lying in a plane parallel to the film pathway between the rollers, and a casing part extending over at least one of the rollers and displaced rearwardly from the outer edge of the inclined plane surface to provide a shoulder on the outer edge of the surface having free access vertically above it to facilitate positioning film on the surface.

Other objects, features and advantages of the invention will be readily apparent from the following description of the preferred embodiments thereof, taken in conjunction with the accompanying drawings, although variations and modifications may be effected without departing from the spirit and scope of the novel concepts of the disclosure.

DESCRIPTION OF THE PREFERRED EMBODIMENT

Figure 1:
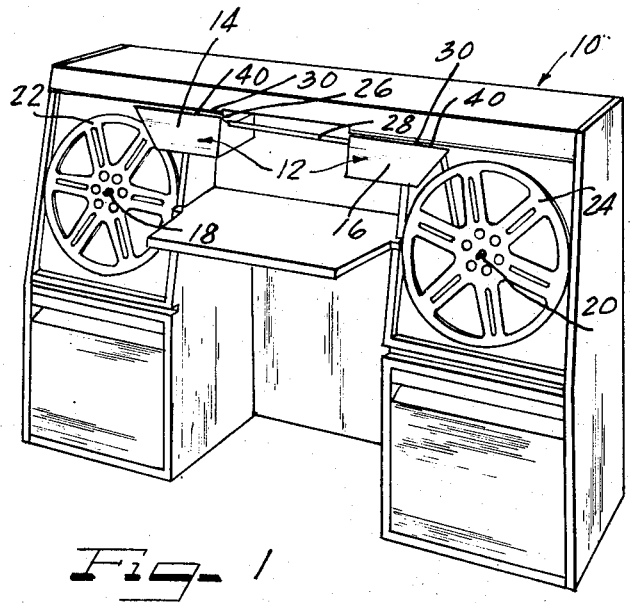
FIG. 1 is a perspective view of a film inspection machine embodying the loading device of the present invention.

In FIG. 1, there is shown in perspective a film inspection machine 10 embodying the present loading device 12 which in this machine consists of two pieces 14 and 16. The film inspection machine 10 has means or rods 18 and 20 on which, respectively, a feed roller 22 and take-up roller 24 can be positioned relative to one another. Next to each roll there is provided a longitudinal opening 26 through which the film 28 passes when being loaded in the machine. The opening, as shown in FIG. 2 and described below, is formed by a casing part, an angular surface 30 of the machine 10, and the top side 40 of the loading device.

Figure 2:
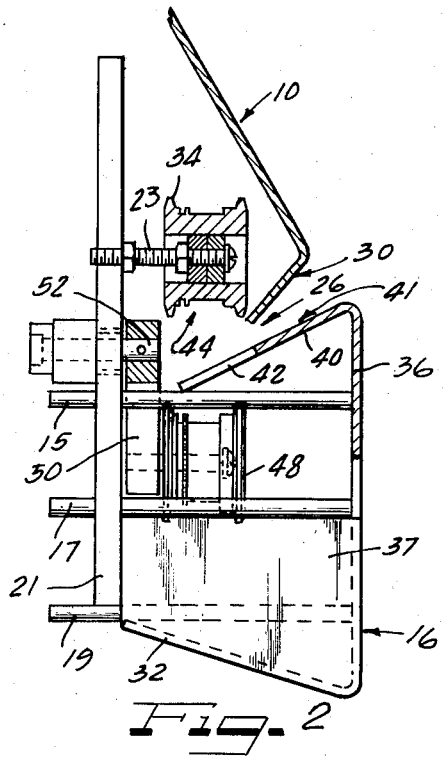
FIG. 2 is a partial side elevational view, in section, of the film inspection machine shown in FIG. 1, illustrating the arrangement of the present loading device with parts of the film inspection machine.

Referring to FIG. 2, there is shown a side view, in section, of the right hand piece 16 of the loading device 12 in association with components of the inspection machine 10. As illustrated in FIG. 1 and shown in detail in FIG. 2, the loading device is adapted to be incorporated with and be a part of the inspection machine. The loading device 12 is mounted on the front side of the machine 10 on its supporting base 32 and secured in position by rods 15, 17 and 19 attached thereto and mounted in a wall 21 in the machine 10. The loading device is positioned in close proximity below and idler sprocket roller 34 rotatably mounted on the wall 21 by a bolt 23.

The loading device includes a front side 36 and partial end sides 37 extending upward from the support base 32 and the top side 40 which is an inclined surface canted downwardly from the front side 36 toward the space between the rollers. The top side is preferably canted downwardly from the front side at an angle of between about 15° and 30°. The top side has an extended integral end portion 42 which with the top side 40 is arranged to taper from the outer to the inner edges of the top side toward the space between the rollers which lie in a plane parallel to the film pathway 44 just below the idler roller 34 and between the feed and take-up rollers.

In FIG. 2, it can be seen that the top side 40 of the loading device with the casing part 30 of the film inspection machine 10 form the opening 26 which tapers inwardly into the machine and toward the space between the rollers and the predetermined pathway 44 of the film 28. The casing part 30 which extends over the rollers is displaced rearwardly from the outer edge of the top side 40 to provide a shoulder 41 on the outer edge of the top side 40, having a free access vertically above it to facilitate and ease the positioning of the film on the top side when it is being loaded in the inspection machine. Then, the film by its own weight descends along the canted surface of the top side 40 and the extended end portion 42 toward the film pathway 44 between the feed and the take-up rollers.

The casing part 30 in order to provide a shoulder 41 of a width greater than that of film 28, should be displaced rearwardly from the outer edge of the top side 40 at a distance at least greater than the width of the film. Preferably, the casing part 30 should be displaced rearwardly from the outer edge at a distance substantially greater than the width of film to provide a shoulder having a greater free access vertically above it for positioning the film on the top side.

Figure 3:
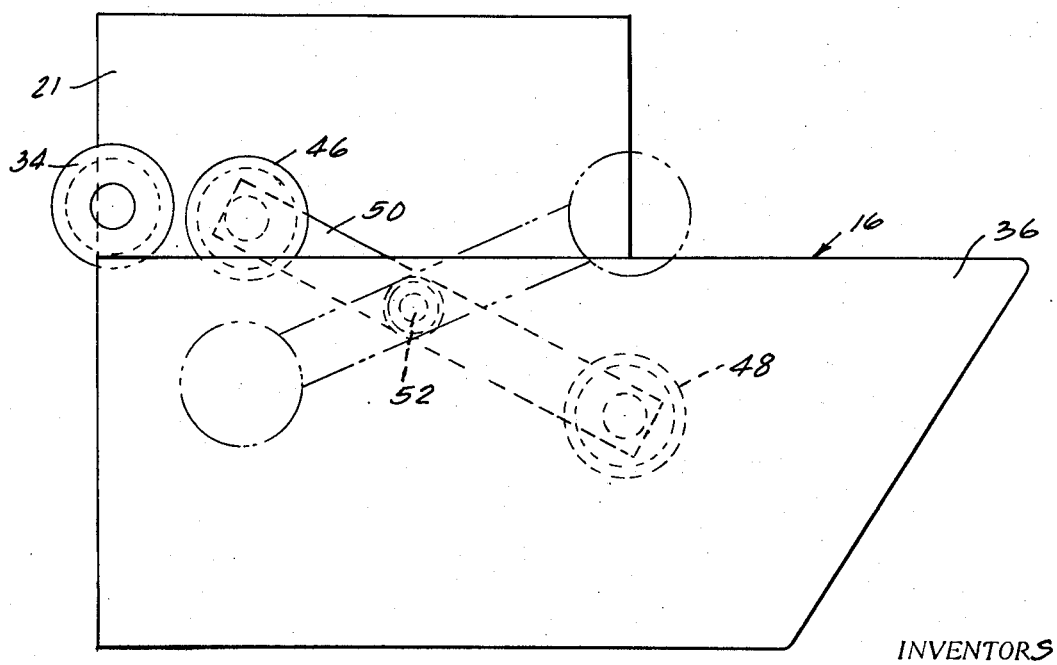
FIG. 3 is a front elevational view of the arrangement illustrated in FIG. 2 of the present loading device with parts of the film inspection machine.

As shown in FIGS. 2 and 3, there are means provided in the film inspection machine which lift the film 28 to the pathway 44 in contact with the sprocket idler roller 34 on which the film 28 is guided along its pathway in between the feed and take-up rollers. These means include rollers 46 and 48 rotatably mounted, respectively, at each end of a bar 50 which is pivoted on a bolt 52 mounted in the wall 21 within the film inspection machine 10. After the film descends the top side 40 and end portion 42 to the space between the feed and take-up rollers, it comes in contact with the roller 46 and when the bar 50 is pivoted upward in a clockwise manner, the film is lifted by the roller 46 in contact with the idler roller 34. When the film 28 comes in contact with roller 48, the bar 50 is pivoted upward, instead, in a counterclockwise manner to lift the film in contact with the idler roller 34.

In the operation of loading the film 28 in the inspection machine 10, initially the feed and take-up rollers 22, 24 are placed on their respective mounting rods 18, 20 with the film 28 extended inbetween them with a certain amount of looseness and slack. Then, the film is placed longitudinally on the shoulder 41 on the top side 40 of the loading device, and the film by its own weight descends along the top side 40 and end portion 42 toward its pathway 44 and on roller 46. The roller 46 is pivoted upward on bar 50 and lifts the film 28 in contact with the idler roller 34 which guides the film along its pathway 44 in between the feed and take-up rollers.

The loading device according to the present invention need not consist of several pieces welded or attached together but can be one integral piece of material formed into the supporting base 32, partial sides 37, front side 36 and top side 40 as described above and illustrated in the drawings. The loading device may be made of any suitable material of sufficient durability for being a part of the transport mechanism on which it is to be mounted. Generally, the loading device can be made of the same or of a material similar to that used to construct the mechanism it is to be mounted on. Accordingly, the loading device can be made of any of the several metals or plastics used in such construction.

The loading device has been described herein as consisting of two pieces only to illustrate an embodiment of the loading device useful in a film inspection machine. Accordingly, the loading device can consist of one piece and also can be modified in structure and form to be utilized in various transport mechanisms wherein there is loaded a strip, film, tape or the like.

From the description above, it is apparent that the present loading device provides a means for the loading of strips, films, tapes or the like without any difficult and time-consuming threading process in various machines such as film editors, film and tape inspection machines, and tape recorders.

Although minor modifications might be suggested by those versed in the art, it should be understood that we wish to embody within the scope of the patent warranted herein all such modifications as reasonably and properly come within the scope of our contribution to the art.

We claim as our invention:

1. In a film transport mechanism, including a spaced pair of relatively movable rollers, the improvement of means for positioning a film in the film pathway between said rollers which comprises:
   means for positioning said rollers relative to one another;
   an inclined plane surface canted downwardly toward the space between said open rollers and lying in a plane parallel to the film pathway between said rollers;
   a casing part extending over at least one of said rollers and displaced rearwardly from the outer edge of said inclined plane surface to provide a shoulder on the outer edge of said surface having free access vertically above it to facilitate positioning film on said surface.

2. In a film transport mechanism, including a spaced pair of relatively movable rollers, the improvement of means for positioning a film in the film pathway between said rollers which comprises:
   means for positioning said rollers relative to one another;
   an inclined plane surface canted downwardly toward the space between said open rollers and lying in a plane parallel to the film pathway between said rollers;
   a casing part extending over at least one of said rollers and displaced rearwardly from the outer edge of said inclined plane surface to provide a shoulder on the outer edge of said surface having free access vertically above it to facilitate positioning film on said surface; and
   a tapered end edge on said inclined plane surface tapering from the outer to the inner edges of said surface toward the film pathway between said rollers.

3. In a film transport mechanism according to claim 2, wherein the inclined surface is canted downwardly at an angle between about 15° and 30°.

4. In a film transport mechanism according to claim 2, wherein the casing part is displaced rearwardly from said outer edge at a distance greater than the width of said film.

5. In a film transport mechanism according to claim 2, wherein the shoulder on the outer edge of the inclined surface has a width substantially greater than the width of said film.

6. In a film transport mechanism according to claim 2, wherein the inclined surface plane and cover part are arranged to form a tapered opening tapering toward the film pathway between said rollers.

7. In a film transport mechanism according to claim 6, wherein the inclined surface is canted downwardly sufficiently to have the film by its own weight after being positioned on said shoulder, descend said surface into the film pathway between said rollers.

8. A device for loading film easily in a film transport mechanism having a spaced pair of relatively movable rolls and a predetermined film pathway inbetween said rolls, said device comprising a supporting base for mounting the device on said mechanism, a front side extending upward from said base, and a top side canted downwardly from said front side at an angle of between about 15° and 30° toward the space between said rollers and lying in a plane parallel to the film pathway between said rollers, said top side being arranged to form an inwardly tapered opening in said mechanism with a casing part thereof, said casing part being extended over at least one of said rollers and displaced rearwardly from the outer edge of said top side to provide a shoulder on the outer edge of said top side having free access vertically above it to facilitate positioning film on said top side.

9. A loading device according to claim 8, wherein the casing part is displaced rearwardly from said outer edge at a distance greater than the width of said film.

10. A loading device according to claim 8, wherein the shoulder on the outer edge of the top side has a width substantially greater than the width of said film.

11. In a film transport mechanism including means defining a film guideway, the improvement of means for positioning a film within the guideway which comprises:

an elongated seating surface inclined from one to another of its side edges and extending laterally of said transport mechanism and protruding forwardly therefrom; and a casing part extending above said inclined surface and displaced rearwardly of the outermost side edge of said surface to expose a shoulder on said surface adjacent the outermost side edge thereof with free vertical access thereabove to facilitate positioning a film on said surface and thence into said film guideway.

12. A film transport mechanism according to claim 11, wherein at least one end edge of said surface defines an acute angle relative to said outermost side edge of said surface and means are provided to draw the film over and around said acute angle edge to further cause said film to move into said film guideway.

* * * * *